United States Patent [19]
Taya et al.

[11] Patent Number: 5,778,214
[45] Date of Patent: Jul. 7, 1998

[54] BIT-PHASE ALIGNING CIRCUIT

[75] Inventors: Takashi Taya; Akira Yoshida; Shinsuke Yamaoka; Shuichi Matsumoto, all of Tokyo, Japan

[73] Assignee: Oki Electric Industry Co., Ltd., Tokyo, Japan

[21] Appl. No.: 564,657

[22] Filed: Nov. 29, 1995

[30] Foreign Application Priority Data

Dec. 9, 1994 [JP] Japan ................. 6-306007

[51] Int. Cl.$^6$ ................................. G06F 1/04
[52] U.S. Cl. .............. 395/551; 395/552; 395/558
[58] Field of Search ....................... 395/551, 555, 395/558, 559

[56] References Cited

U.S. PATENT DOCUMENTS

| | | | |
|---|---|---|---|
| 4,756,011 | 7/1988 | Cordell | 375/118 |
| 4,773,085 | 9/1988 | Cordell | 375/120 |
| 4,821,296 | 4/1989 | Cordell | 375/119 |
| 5,081,655 | 1/1992 | Long | 375/119 |
| 5,134,636 | 7/1992 | Barucchi et al. | 375/106 |
| 5,278,873 | 1/1994 | Lowrey et al. | 375/118 |
| 5,550,860 | 8/1996 | Georgiou et al. | 375/220 |

FOREIGN PATENT DOCUMENTS

| | | | |
|---|---|---|---|
| 2-228839 | 9/1990 | Japan | H04L 7/02 |
| 4-293332 | 10/1992 | Japan | H04L 7/02 |
| 5-219040 | 8/1993 | Japan | H04L 7/027 |

OTHER PUBLICATIONS

Robert R. Cordell, "A 45 —Mbit/s CMOS VLSI Digital Phase Aligner," IEE Journal of Solid–State Circuits, vol. 23, No. 2, (Apr. 1988), pp. 323–328.

*Primary Examiner*—Dennis M. Butler
*Attorney, Agent, or Firm*—Rabin & Champagne, P.C.

[57] ABSTRACT

A bit-phase aligning circuit includes a bit-phase adjusting circuit and a synchronizing pattern detection circuit. The bit-phase adjusting circuit adjusts a phase difference between a data signal and a clock signal by adjusting a delay amount of the data signal based on a determination result signal from the synchronizing pattern detection circuit. In the synchronizing pattern detection circuit, the data signal is sampled using the clock signal so as to detect a synchronizing pattern inserted in the data signal. When the synchronizing pattern is detected, the synchronizing pattern detection circuit determines that a phase relationship between the data signal and the clock signal is proper. On the other hand, when not detected, the synchronizing pattern detection circuit determines the phase relationship therebetween to be improper. This determination result signal is fed to the bit-phase adjusting circuit where the phase difference between the data signal and the clock signal is adjusted.

11 Claims, 15 Drawing Sheets

BIT-PHASE ALIGNING CIRCUIT

CROSS-REFERENCE TO RELATED APPLICATION

This application claims priority benefits under 35 U.S.C. §119, of Japanese Patent Application No. Hei 06-306007 filed on Dec. 9, 1994, the entire disclosure of which is incorporated herein by reference.

BACKGROUND OF THE INVENTION

1. Field of the Invention

The present invention relates to a bit-phase aligning circuit, and particularly to an improvement in reliability of the bit-phase synchronization.

2. Description of the Prior Art

Between devices constituting a communication system, a large quantity of data signals is transmitted and received. Clock signals for processing these data signals are distributed from a reference clock source to the respective devices.

In the communication system where a data rate is low, the receiver-side device easily regenerates and processes a data signal sent from the transmitter-side device using the distributed clock. However, when the data rate is increased, a difference between delays in a data path and a clock distribution path can grow until it is about a full data bit period. Accordingly, it is difficult to ensure the reliable regeneration and processing of the data signal at the receiver-side device using the distributed clock.

One method of solving such a problem is to have the receiver-side device regenerate a clock component from the data signal using a resonant element or a PLL (phase-locked loop) circuit. However, in general, the resonant element or the PLL circuit is disadvantageous in that it is high in cost and large in size as compared with a digital integrated circuit.

When the clock signals are distributed to the transmitter-side device and the receiver-side device from the same clock source, the receiver-side device can regenerate and process the data signal without using the resonant element or the PLL circuit, if a phase relationship between the data signal and the clock signal can be adjusted. For receiving the data signal accurately at the receiver-side device, a transmission delay in the data signal path or a phase of the clock signal is sometimes set or adjusted based on a human being's determination. On the other hand, a bit-phase aligning circuit for automatically achieving such setting or adjustment in the receiver-side device has been proposed, for example, in Japanese First (unexamined) Patent Publication No. 4-293332.

FIG. 16 is a diagram showing a structure of the bit-phase aligning circuit shown in the publication. In FIG. 16, the bit-phase aligning circuit includes a bit-phase adjusting circuit 21 and a bit change point detection circuit 22. The bit-phase adjusting circuit 21 adjusts a phase relationship between a received data signal and a distributed clock signal in a later-described manner. The bit change point detection circuit 22 detects, using a data signal and a clock signal output from the bit-phase adjusting circuit 21, a time relationship between transition points of the data signal (transition points from "1" to "0" and from "0" to "1" in a digital signal) and the clock signal. Based on the detection result, the bit change point detection circuit 22 determines whether the phase relationship therebetween should be maintained or changed for accurately receiving the data signal, and further determines a direction of the change to be effected.

The bit-phase adjusting circuit 21 adjusts the phase relationship between the received data signal and the distributed clock signal based on the determination result of the bit change point detection circuit 22.

Several methods have been used for realizing the bit-phase adjusting circuit 21. For example, a delay time of the data signal or the clock signal may be changed using a variable delay circuit,or a proper clock signal may be selected from multi-phase clock signals. From the methods available, one method is selected based on a human being's determination.

Likewise, several methods have also been used for realizing the bit change point detection circuit 22. For example, a plurality of signals may be produced from the data signal by producing time differences therebetween using delay elements, sampled by flip-flops operated with the same clock and provided to an exclusive OR gate. Alternatively, the data signal may be sampled by flip-flops operated by different clocks and provided to an exclusive OR gate. As another alternative, delay elements and an exclusive OR gate may be used to produce pulses corresponding to transition points of the data signal. These methods and others are proposed in the foregoing publication and in Japanese First (unexamined) Patent Publication No. 2-228839.

In the foregoing methods, the time relationship between the transition points of the data signal and the clock signal is monitored by the detection circuit 22 to determine whether the phase relationship therebetween should be maintained or changed for accurately receiving the data signal and further to determine a direction of the change to be achieved, and the detection circuit 22 provides the determination result to the bit-phase adjusting circuit 21.

However, in the foregoing methods, since the transition points of the input data signal are monitored, if noise is contained in the input data signal, false transition points due to the noise are detected resulting in a failure in the operation of the transmitter-side device.

Further, when the variable delay circuit is used in the bit-phase adjusting circuit, it is preferable that, at the time of starting the device or immediately after restoration from an abnormal state of the data signal transmission path, a default delay is set near the center of a variable delay range of the variable delay circuit to provide an operation margin relative to a phase variation thereafter. However, using conventional methods, no means is provided in the bit-phase aligning circuit for realizing such a function so that it is necessary to provide an external initializing signal.

SUMMARY OF THE INVENTION

Therefore, it is an object of the present invention to provide an improved bit-phase aligning circuit.

According to one aspect of the present invention, a bit-phase aligning circuit comprises bit-phase adjusting means for receiving input data containing therein a synchronizing pattern and adjusting a bit-phase difference between the input data and an input clock; and synchronizing pattern detection means for detecting the synchronizing pattern from the input data and determining whether a phase relationship between the input data and the input clock is proper or improper based on whether the synchronizing pattern is detected or not, the synchronizing pattern detection means controlling the bit-phase adjusting means to adjust the bit-phase difference based on this determination result.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENTS

Now, preferred embodiments of the present invention will be described hereinbelow with reference to the accompanying drawings.

In a bit-phase aligning circuit according to the following preferred embodiments, a synchronizing pattern detection circuit is provided for monitoring a synchronizing pattern contained in an input data signal, and a bit-phase adjusting circuit is controlled based on detection of the synchronizing pattern.

In general, synchronizing patterns for frame synchronization, cell synchronization, or word synchronization are periodically added to the data signal which is transmitted and received between the devices constituting the communication (transmission) system. In the bit-phase aligning circuit according to the following preferred embodiments, a data signal is sampled with a clock signal to monitor a synchronizing pattern. Depending on whether the synchronizing pattern is detected or not, the synchronizing pattern detection circuit determines whether a phase relationship between the data signal and the clock signal should be maintained or changed for accurately receiving the data signal, and further determines a direction of the change to be implemented. Based on this determination, an operation of the bit-phase adjusting circuit is controlled.

First Embodiment

Figure 1:
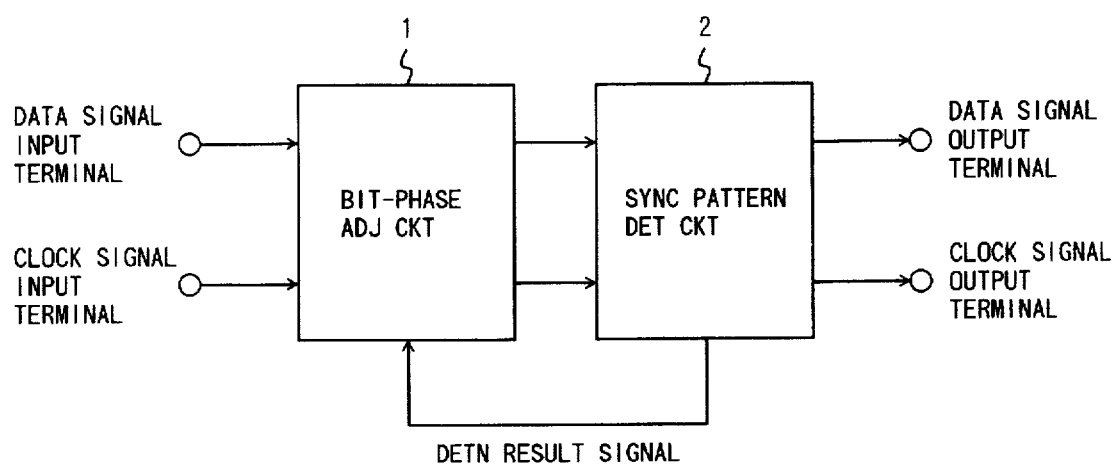
FIG. 1 is a diagram showing a schematic structure of a bit-phase aligning circuit according to a first preferred embodiment of the present invention.

FIG. 1 is a schematic diagram showing a structure of the bit-phase aligning circuit according to the first preferred embodiment. In FIG. 1, the bit-phase aligning circuit includes a bit-phase adjusting circuit 1 and a synchronizing pattern detection circuit 2. A data signal and a clock signal are provided to the bit-phase adjusting circuit, as well as a determination result signal from the pattern detection circuit 2.

On the other hand, a data signal and a clock signal are provided to the pattern detection circuit 2 by the bit-phase adjusting circuit 1. In the pattern detection circuit 2, the data signal is sampled using the clock signal, so as to monitor the synchronizing pattern contained in the input data signal. If the synchronizing pattern is detected, the pattern detection circuit 2 determines that the phase relationship between the data signal and the clock signal is proper. On the other hand, if the synchronizing pattern is not detected, the pattern detection circuit 2 determines the phase relationship therebetween to be improper. This determination result is given to the bit-phase adjusting circuit 1 where a phase difference between the data signal and the clock signal is adjusted.

Figure 2:
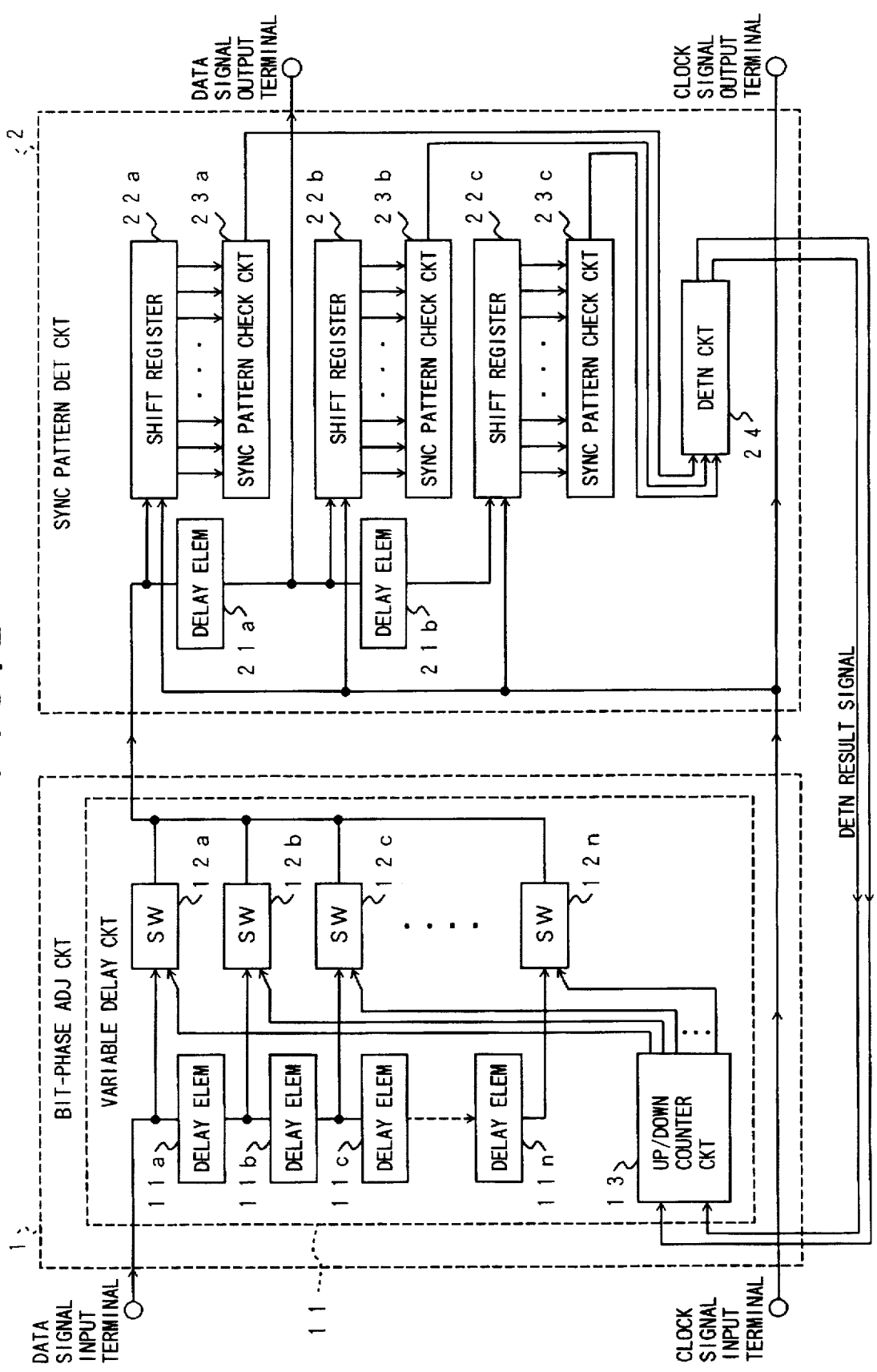
FIG. 2 is a diagram showing a detailed structure of the bit-phase aligning circuit shown in FIG. 1.

FIG. 2 is a diagram showing a detailed structure of the bit-phase aligning circuit shown in FIG. 1. As shown in FIG. 2, the bit-phase adjusting circuit 1 is essentially constituted by a variable delay circuit 11. The bit-phase adjusting circuit 1 adjusts a phase difference between the data signal and the clock signal by adjusting a delay of the data signal. The variable delay circuit 11 includes a plurality of delay elements $11a$–$11n$ connected in series relative to the data signal, switches $12a$–$12n$ for selectively providing one of outputs from the delay elements $11a$–$11n$, and an up/down counter circuit 13 for controlling operations of the switches $12a$–$12n$ based on the determination result signal from the pattern detection circuit 2.

Figure 13A:
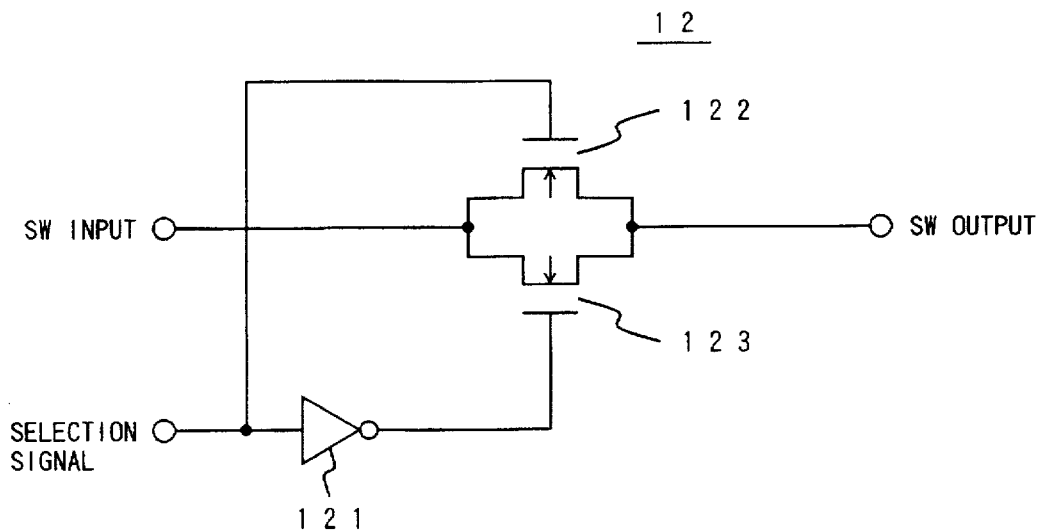
FIG. 13A is a diagram showing an example of a structure of a switch employed in the preferred embodiments of the present invention.
Figure 13B:
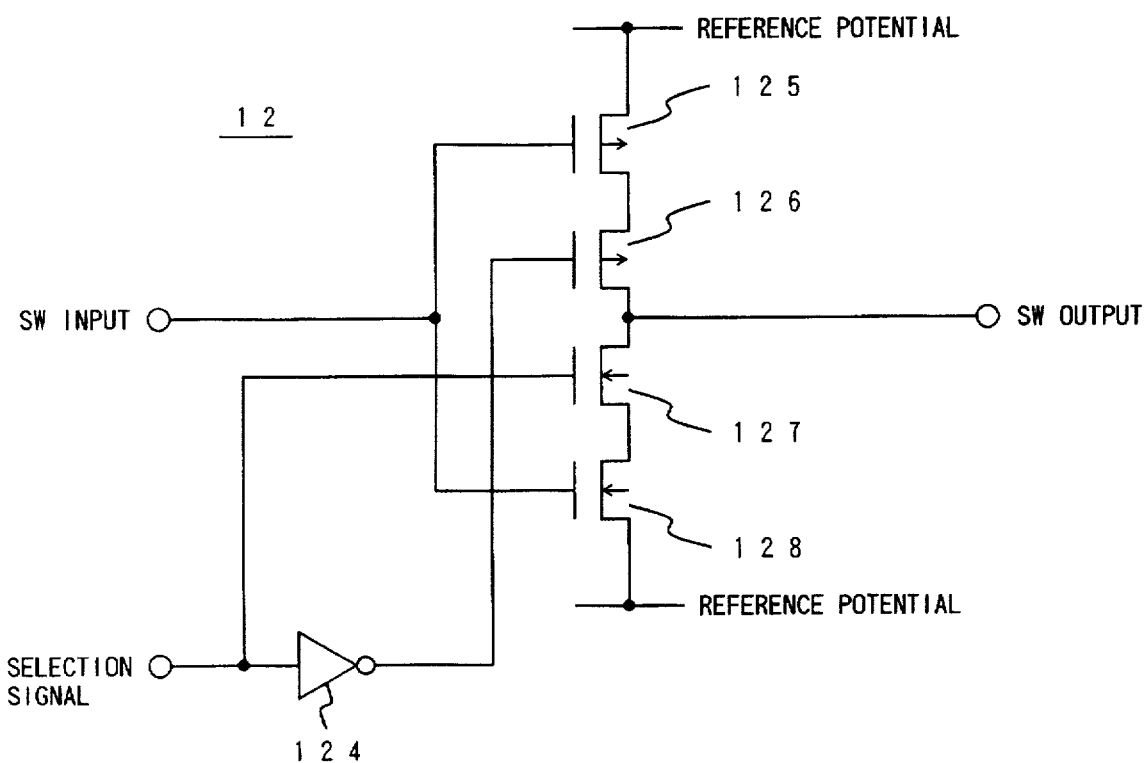
FIG. 13B is a diagram showing another example of a structure of the switch employed in the preferred embodiments of the present invention.

Each of the switches $12a$–$12n$ can be realized by a structure shown in FIG. 13A or 13B, and thus is an electric circuit element which can be turned on or off depending on a selection or control signal. Accordingly, the structure of the switch $12a$–$12n$ differs from a selector achieved by a logic circuit in the form of, for example, an AND gate or an OR gate. By employing the switch structure shown in FIG. 13A or 13B, the likelihood of generation of an undesirable component (waveform distortion) upon switching due to an operation of the conventional selector can be reduced. Nonetheless, such a conventional selector may still be used for selecting one of the outputs from the delay elements $11a$–$11n$.

In FIG. 2, the pattern detection circuit 2 includes delay element $21a$ and $21b$, shift registers $22a$–$22c$, synchronizing pattern check circuits $23a$–$23c$, and a determination circuit 24. The synchronizing pattern is a particular code inserted in the data signal, pursuant to a certain rule in the transmitter-side device.

Figure 3:
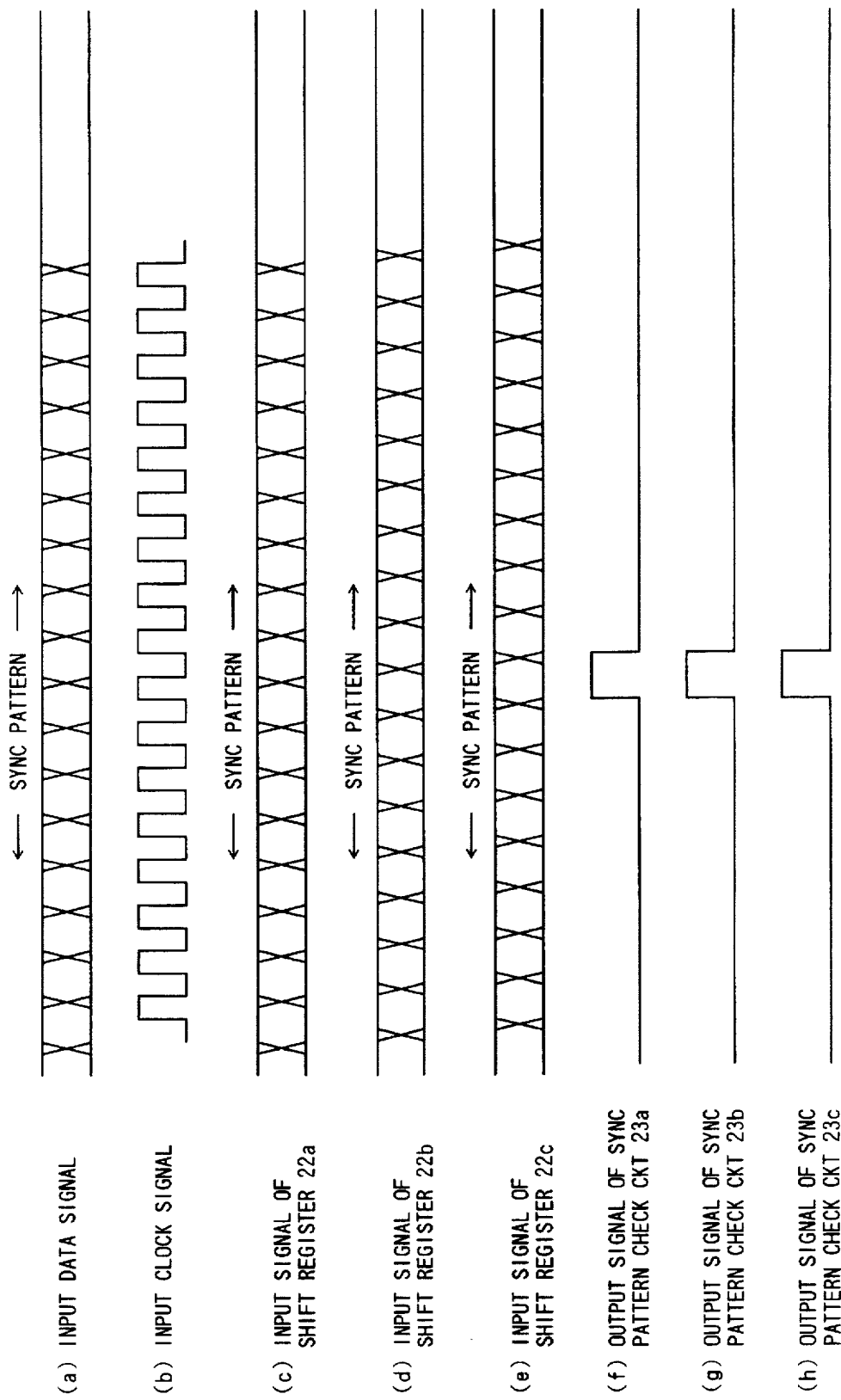
FIG. 3 is a timing chart showing a first operation of the bit-phase aligning circuit shown in FIG. 1.
Figure 4:
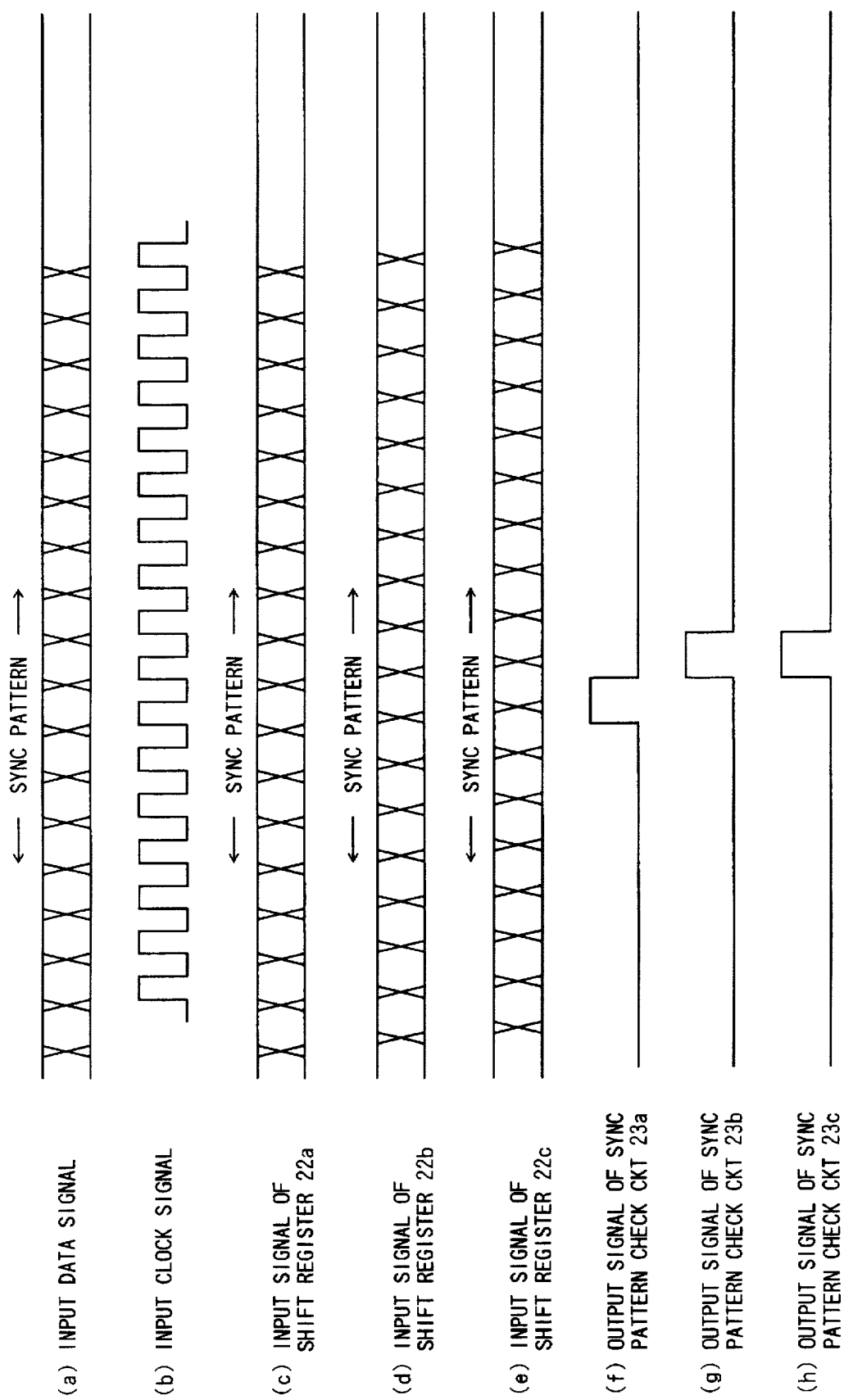
FIG. 4 is a timing chart showing a second operation of the bit-phase aligning circuit shown in FIG. 1.
Figure 5:
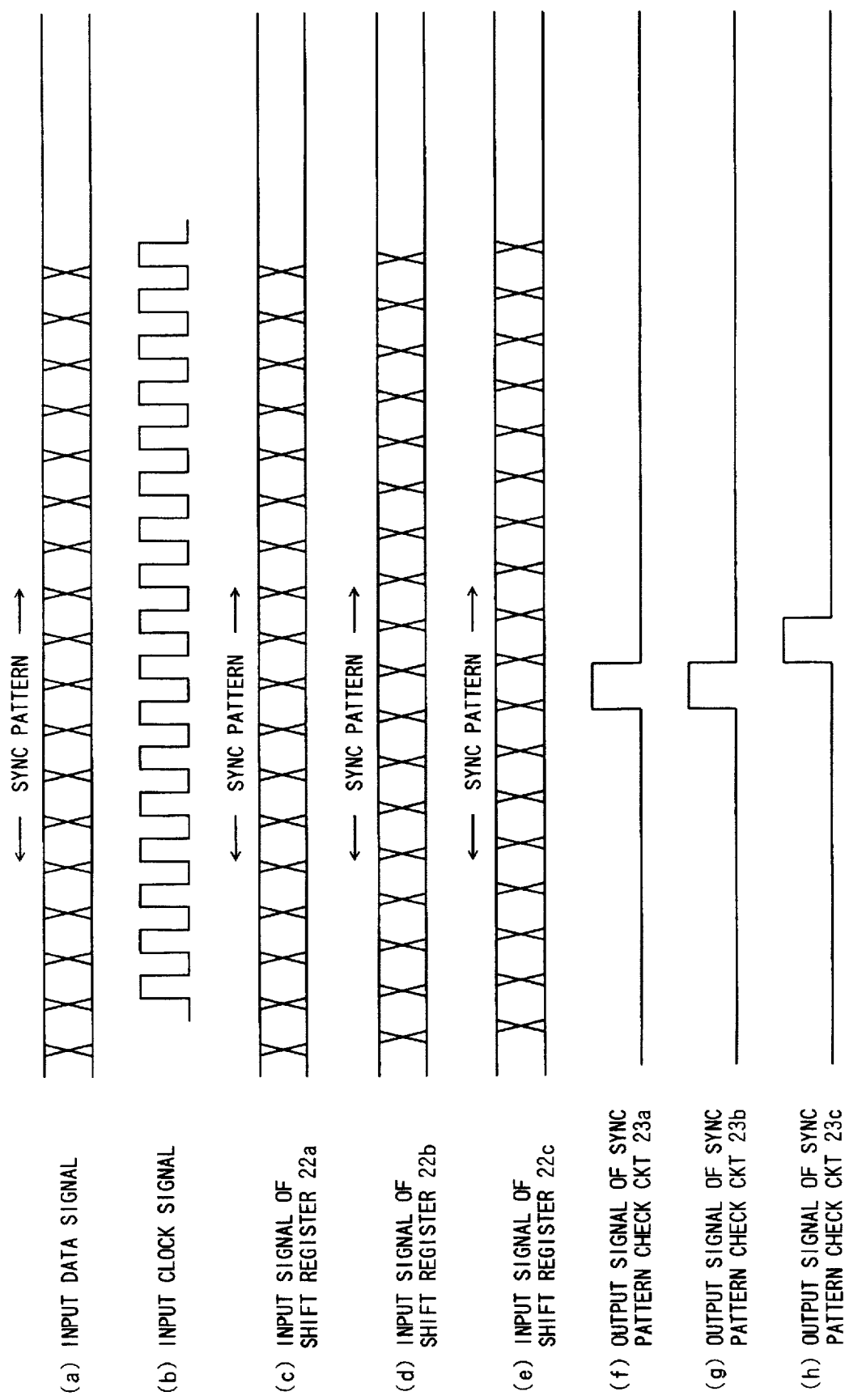
FIG. 5 is a timing chart showing a third operation of the bit-phase aligning circuit shown in FIG. 1.

FIGS. 3 to 5 are timing charts, respectively, each showing an operation of the foregoing bit-phase aligning circuit. In the foregoing bit-phase aligning circuit, it is assumed that a delay of the variable delay circuit 11 at the initial state is set to a given value, for example, the center of a variable delay range thereof. The data signal provided to the bit-phase aligning circuit is received at the shift register 22a via the variable delay circuit 11, to the shift register 22b via the variable delay circuit 11 and the delay element 21a, and to the shift register 22c via the variable delay circuit 11 and the delay elements 21a and 21b. If phase relationships of the data signal and the clock signal in the corresponding shift registers 22a–22c are such that the data can be accurately sampled, the corresponding pattern check circuits 23a–23c detect the synchronizing pattern, respectively, as shown in FIG. 3.

If the synchronizing pattern is detected simultaneously in all the pattern check circuits 23a–23c as shown at (f)–(h) in FIG. 3, the determination circuit 24 holds the current phase relationship between the data signal and the clock signal as determining that the bit-phase synchronization is achieved or established. On the other hand, when no synchronizing pattern is detected in any of the pattern check circuits 23a–23c after a lapse of a given time, the determination circuit 24 causes the variable delay circuit 11 to change the amount of delay time and continues checking the synchronizing pattern.

Further, as shown at (f)–(h) in FIG. 4, if the synchronizing pattern is detected simultaneously only in the pattern check circuits 23b and 23c, the determination circuit 24 causes the variable delay circuit 11 to increase the delay time. With this arrangement, even when the amount of delay between the data signal and the clock signal changes, bit-phase synchronization can be achieved.

On the other hand, as shown at (f)–(h) in FIG. 5, if the synchronizing pattern is detected simultaneously only in the pattern check circuits 23a and 23b, the determination circuit 24 causes the variable delay circuit 11 to reduce the delay time. With this arrangement, even when the amount of delay between the data signal and the clock signal changes, bit-phase synchronization can be achieved.

In a transmission method regulated, for example, according to CCITT recommendation G. 708 and G. 709, a synchronizing pattern in the form of a combination of a code 11110110 and a code 00101000 is inserted in a data signal every 125 μsec. This synchronizing pattern is checked in the pattern detection circuit 2 in the manner described above.

Alternatively, when an nBmB code (a code for converting an n-bit signal into an m-bit signal) is used, a command code to be used for synchronization is checked as a synchronizing pattern. Further, an nB1C (n binary 1 complementary) code is used, the pattern check can be achieved by periodically detecting bit inversion. As appreciated, the nB1C code has a code structure wherein, relative to an n-bit input, one bit which is inverse to an (n−1)th bit is added at an (n+1)th position.

In case of an ATM cell signal, the pattern check can be achieved by monitoring a rule of a header error control field of the ATM cell or checking a synchronizing pattern inserted into a vacant cell.

Figure 10:
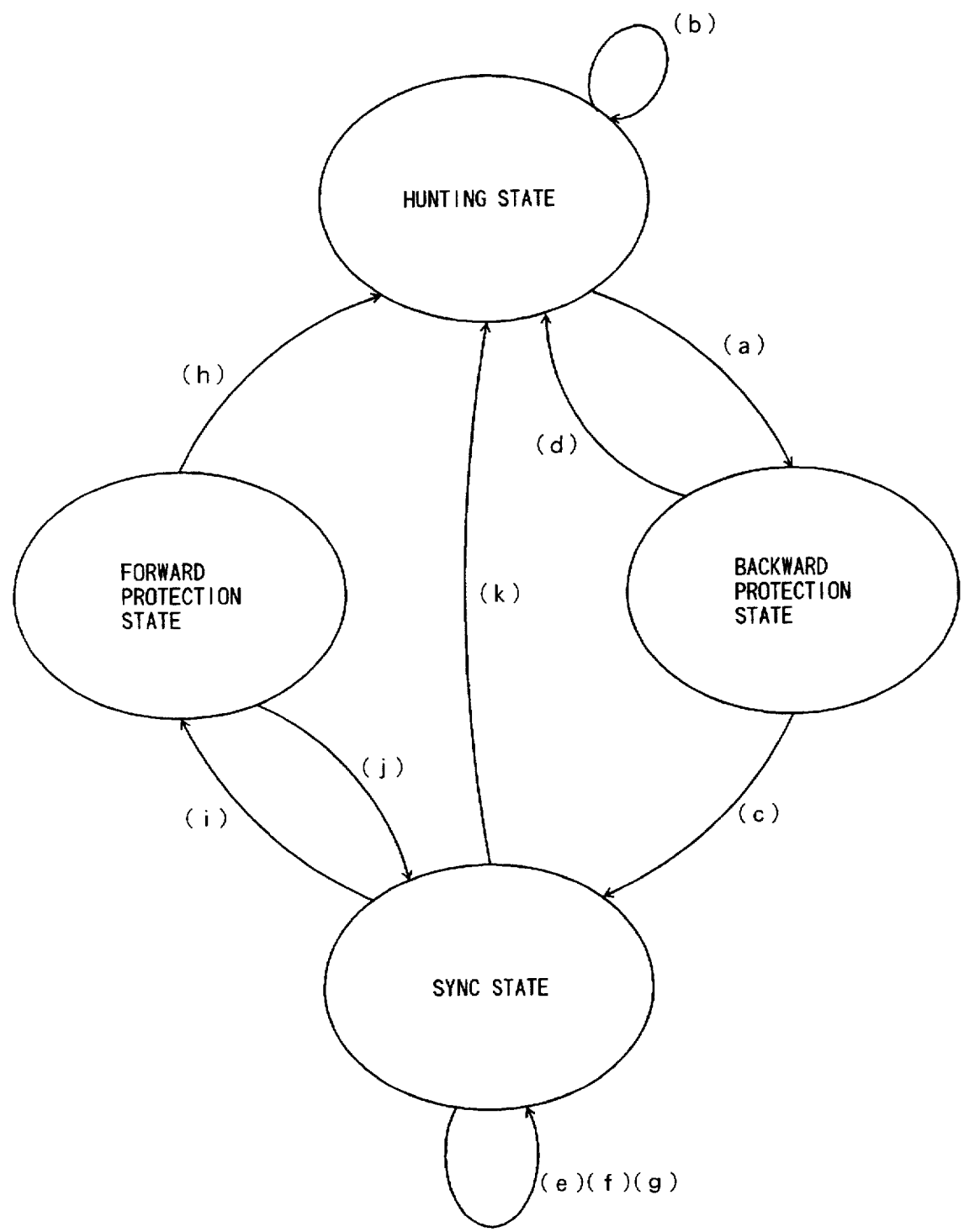
FIG. 10 is a state transition diagram for explaining a control method realized by the bit-phase aligning circuit shown in FIG. 2.

FIG. 10 is a diagram for explaining a method of the control achieved by the bit-phase aligning circuit shown in FIG. 2. As described above, since the synchronizing pattern is inserted pursuant to a given rule at the transmitter-side device, the so-called synchronization protection is performed in general at the receiver-side device by monitoring the synchronizing pattern pursuant to this given rule, so as to avoid an erroneous synchronization or prevent failure of the once-established synchronization due to a transmission path error.

In FIG. 10, it is assumed that the bit-phase aligning circuit is in a hunting state (b) at the time of starting the device. In the hunting state (b), the amount of delay provided by the variable delay circuit 11 is initially set to a value approximate to the center of the variable delay range thereof. When the synchronizing pattern is detected simultaneously in all the pattern check circuits 23a–23c, the state shifts to a backward protection state as shown by an arrow (a). On the other hand, if the synchronizing pattern is not detected for a given time, the delay amount of the variable delay circuit 11 is changed and the synchronizing pattern continues to be monitored as shown by an arrow (b). By repeating this operation, the bit-phase synchronization can be achieved.

In the backward protection state, the insertion of the synchronizing pattern is verified at a predetermined number of times pursuant to the synchronizing pattern insertion rule at the transmitter-side device. When such verification is satisfied, the state shifts to a synchronous state as shown by an arrow (c). On the other hand, when an erroneous synchronization is determined, the state shifts to the hunting state as shown by an arrow (d).

Even in the synchronous state, the check of the synchronizing pattern is continued as shown by an arrow (e). If the synchronizing pattern is detected simultaneously only in the pattern check circuits 23b and 23c, the determination circuit 24 commands the variable delay circuit 11 to increase the delay time as shown by an arrow (f). On the other hand, if the synchronizing pattern is detected simultaneously only in the pattern check circuits 23a and 23b, the determination circuit 24 commands the variable delay circuit 11 to decrease the delay time as shown by an arrow (g). With this arrangement, even if the amount of delay between the data signal and the clock signal changes, the bit-phase synchronization can be maintained.

If the limit of the variable or adjustable delay range of the variable delay circuit 11 is exceeded while repeating the delay time adjustment, the state shifts to the hunting state like at the time of starting the device and the amount of delay provided by the variable delay circuit 11 is reset to the value approximate to the center of the variable delay range thereof as shown by an arrow (h). In the synchronous state, when the synchronizing pattern is not detected pursuant to the synchronizing pattern insertion rule, the state shifts to a forward protection state as shown by an arrow (i).

If the synchronizing pattern is again detected in the forward protection state, the state shifts to the synchronous state as shown by an arrow (j). In the synchronous state, if the synchronizing pattern is not detected over a predetermined number of times in a continuous manner, the state shifts to the hunting state as shown by an arrow (k) as determining failure of the synchronization.

Figure 11:
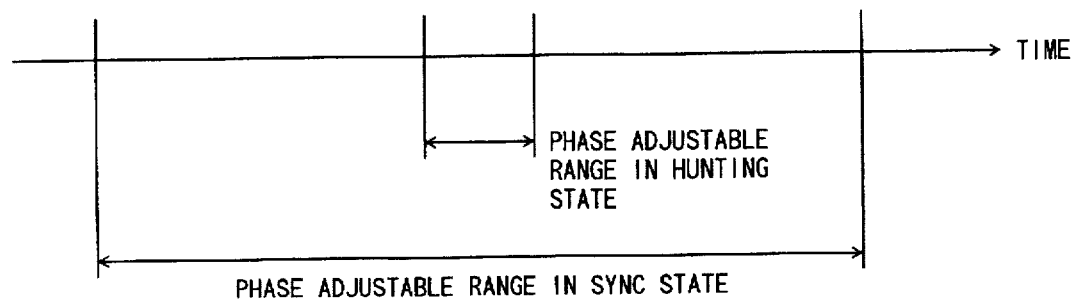
FIG. 11 is a diagram for explaining phase adjustable ranges of a variable delay circuit of the bit-phase aligning circuit shown in FIG. 2.

FIG. 11 is a diagram for explaining phase adjustable ranges of the variable delay circuit 11. In this embodiment, the phase adjustable range of the variable delay circuit 11 in the hunting state is set to be equal to or greater than a full bit period (for example, 10 nsec in case of a data rate being 100 Mbps/sec) of the inputted data signal, for example, 12 nsec, while the phase adjustable range of the variable delay circuit 11 in the synchronous state is set so as to extend largely across the phase adjustable range in the hunting state, for example, being set to 120 nsec. Accordingly, the variable delay circuit 11 is controlled to change the phase adjustable range depending on the state of the bit-phase aligning circuit.

Thus, in the hunting state, the phase adjustment is repeated in the 12 nsec range until the synchronizing pattern is detected. While the synchronizing pattern is transmitted from the transmitter-side device, the synchronization is established without fail by the phase adjustment in this range.

When the synchronizing pattern is detected, so that the state shifts to the synchronous state, the phase adjustable range of the variable delay circuit 11 is extended to 120 nsec, and further, the delay amount is set to be approximate to the center thereof.

While it is desired that the data signal is to be transmitted without error for a long time after the bit-phase aligning circuit enters the synchronous state, the phase relationship between the input data signal and the input clock signal may change due to, for example, a temperature variation. As appreciated, the bit-phase aligning circuit of this embodiment can adapt to such a change of the phase relationship with an adaptive range or width which depends on the foregoing phase adjustable range or width of the variable delay circuit 11.

In this embodiment, the delay amount is automatically set to substantially the center of the phase adjustable width of the variable delay circuit 11 simultaneously upon the bit-phase aligning circuit entering the synchronous state. Accordingly, the phase adjustable range of the variable delay circuit 11 can be used maximally.

If the foregoing control manner is not taken, the state of the variable delay circuit 11 when the bit-phase aligning circuit is started and enters the synchronous state from the hunting state, is unknown, that is, is not fixed. It is possible that the bit-phase aligning circuit operates near the limit of the phase adjustable range of the variable delay circuit 11. For preventing this, an external reset signal may be applied after the bit-phase aligning circuit becomes stable, so as to forcibly set the variable delay circuit 11 at the center of the variable range. However, according to this method, a data error and a frame synchronization failure can not be avoided upon resetting. On the other hand, according to the control method of this embodiment, the variable delay circuit 11 can be automatically set to the center of the variable range without the data error and the frame synchronization failure.

According to the foregoing first preferred embodiment, since the phase relationship between the input data signal and the input clock signal is determined by detecting the synchronizing pattern inserted into the input data signal, operation failure is not likely to happen due noise contained in the input data signal. The reason is that, in this embodiment, a probability of erroneous detection of the synchronizing pattern due to the noise is extremely small. On the other hand, in the foregoing prior art, since the phase control is performed by monitoring the transition points of the input data signal, operation failure is highly likely to occur due to transition points in the input data which are generated at random time points due to noise in the input data signal.

Further, even if the synchronizing pattern is lost once due to noise, causing failure of the synchronization, the synchronization can be easily recovered by detecting the subsequently inserted synchronizing pattern. Accordingly, the operation failure due to the data error is not likely to occur again, so data reception can be continued.

Second Embodiment

Figure 6:
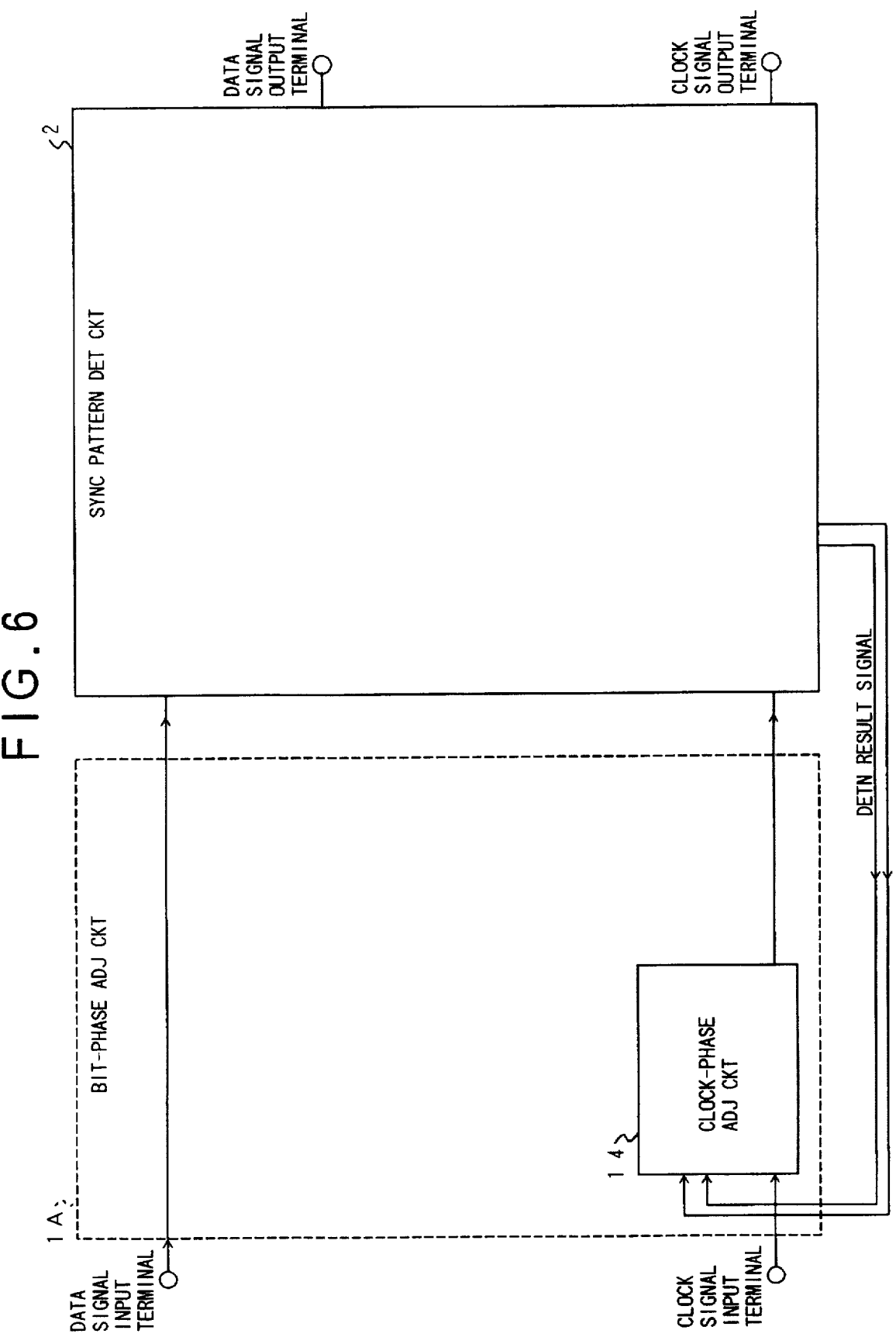
FIG. 6 is a diagram showing a structure of a bit-phase aligning circuit according to a second preferred embodiment of the present invention.

FIG. 6 is a diagram showing a structure of a bit-phase aligning circuit according to a second preferred embodiment of the present invention. The bit-phase aligning circuit of this embodiment features a clock phase adjusting circuit 14 provided in a bitphase adjusting circuit 1A.

The clock phase adjusting circuit 14 changes a phase of the clock signal input from a clock input terminal based on the determination result signal from the pattern detection circuit 2. The phase of the clock signal may be changed by using a variable delay circuit as in the case of the data signal as shown in FIG. 2, or by producing multi-phase clock signals in advance and selecting one of them by a switch or a selector.

With this arrangement, effects similar to those of the foregoing first preferred embodiment can be achieved.

Third Embodiment

Figure 7:
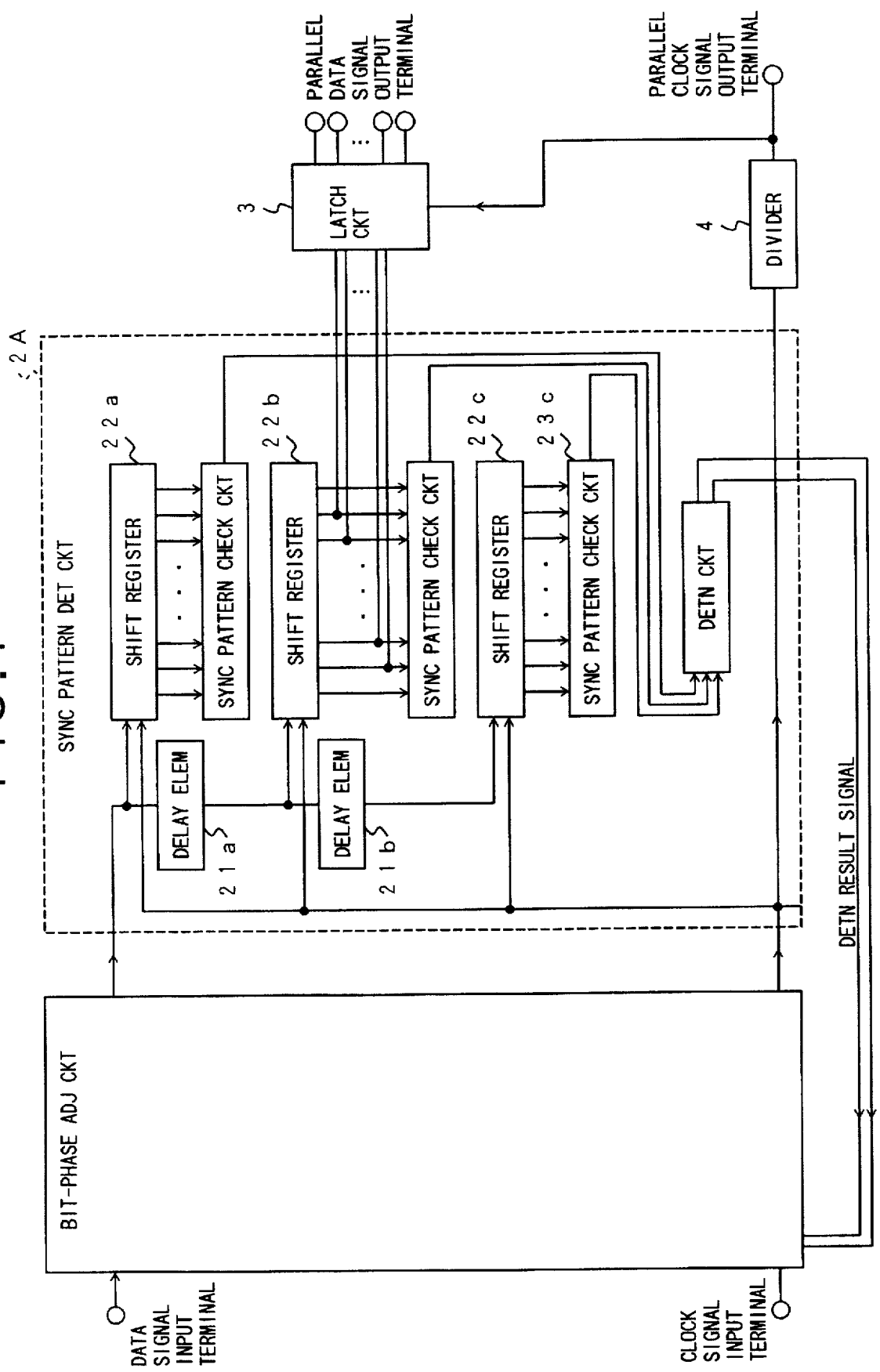
FIG. 7 is a diagram showing a structure of a bit-phase aligning circuit according to a third preferred embodiment of the present invention.

FIG. 7 is a diagram showing a structure of a bit-phase aligning circuit according to a third preferred embodiment of the present invention. The bit-phase aligning circuit of this embodiment includes the feature that some of the output signals from the shift register 22b provided in a synchronizing pattern detection circuit 2A are provided to latch circuit 3 and further that the clock signal is divided by a divider 4 so as to be generated in the form of a parallel clock signal and provided to the latch circuit 3. The latch circuit 3 performs serial-parallel conversion of the data signal so as to generate a parallel data signal.

With this arrangement, effects similar to those of the foregoing first preferred embodiment can be achieved. Further, by using the shift register as a portion of the serial-parallel converter, the number of parts can be reduced. Since the bit-phase aligning circuit is widely used for receiving a large quantity of serial data signals, this embodiment is advantageous for such a use.

Fourth Embodiment

Figure 8:
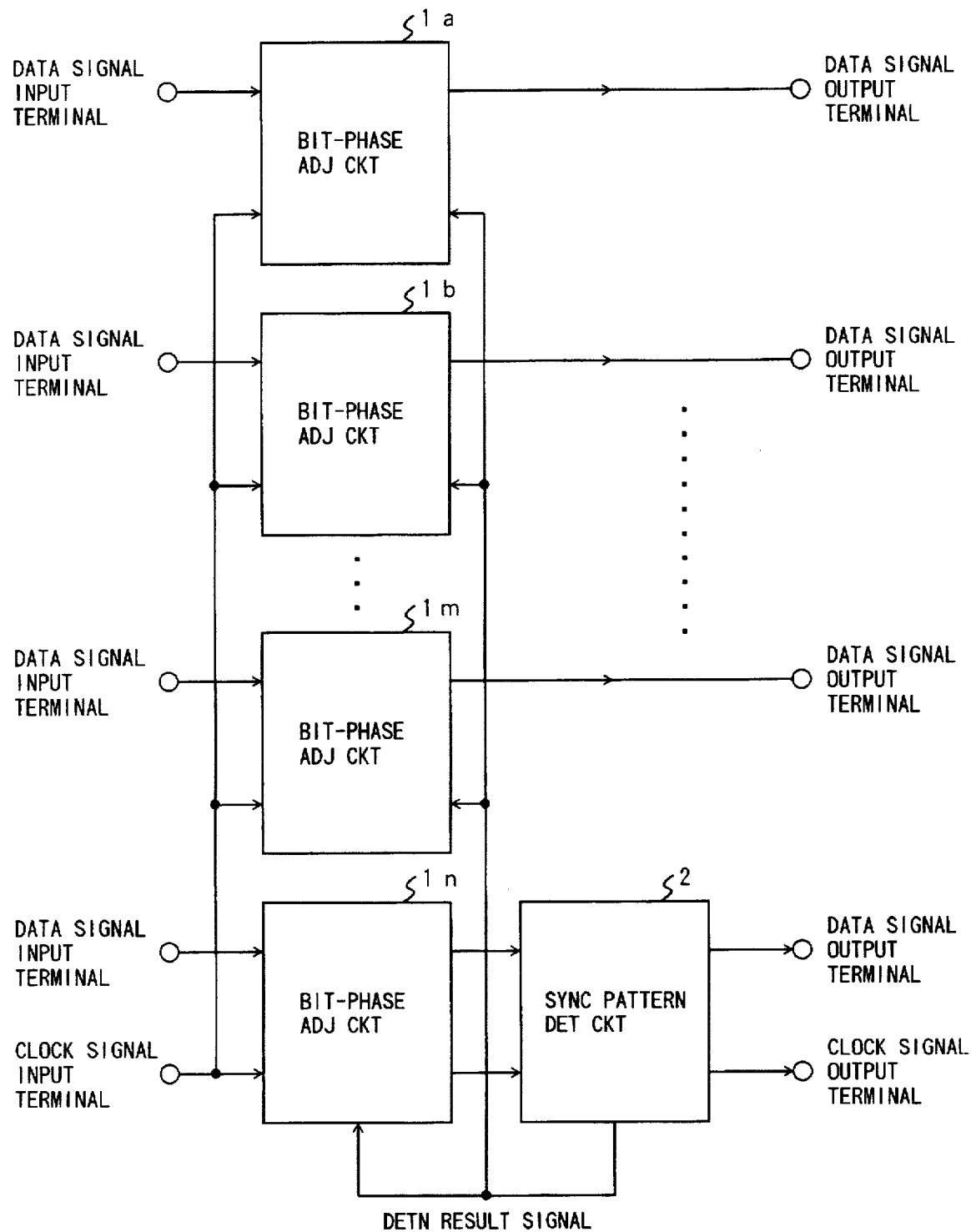
FIG. 8 is a diagram showing a structure of a bit-phase aligning circuit according to a fourth preferred embodiment of the present invention.

FIG. 8 is a diagram showing a structure of a bit-phase aligning circuit according to a fourth preferred embodiment of the present invention. In FIG. 8, the bit-phase aligning circuit includes bit-phase adjusting circuits $1a \sim 1n$ and a synchronizing pattern detection circuit 2. The bit-phase aligning circuit is provided with a plurality of data signals and a common clock signal with which the data signals are transmitted. The data signals are provided to the corresponding bit-phase adjusting circuits $1a \sim 1n$, respectively, while each of the bit-phase adjusting circuits $1a \sim 1n$ also receives the common clock signal. It is arranged that an output of one of the bit-phase adjusting circuits $1a \sim 1n$ is provided to the pattern detection circuit 2, while the determination result signal from the pattern detection circuit 2 is provided to all the bit-phase adjusting circuits $1a \sim 1n$. With this arrangement, the bit-phase alignment can be achieved among a plurality of the data signals.

Effects similar to those of the foregoing first preferred embodiment can be achieved. Further, when a significantly large quantity of the data is transmitted and received, the number of parts of the circuit can be reduced by using the synchronizing pattern detection circuit for a plurality of the data signal paths.

Fifth Embodiment

Figure 9:
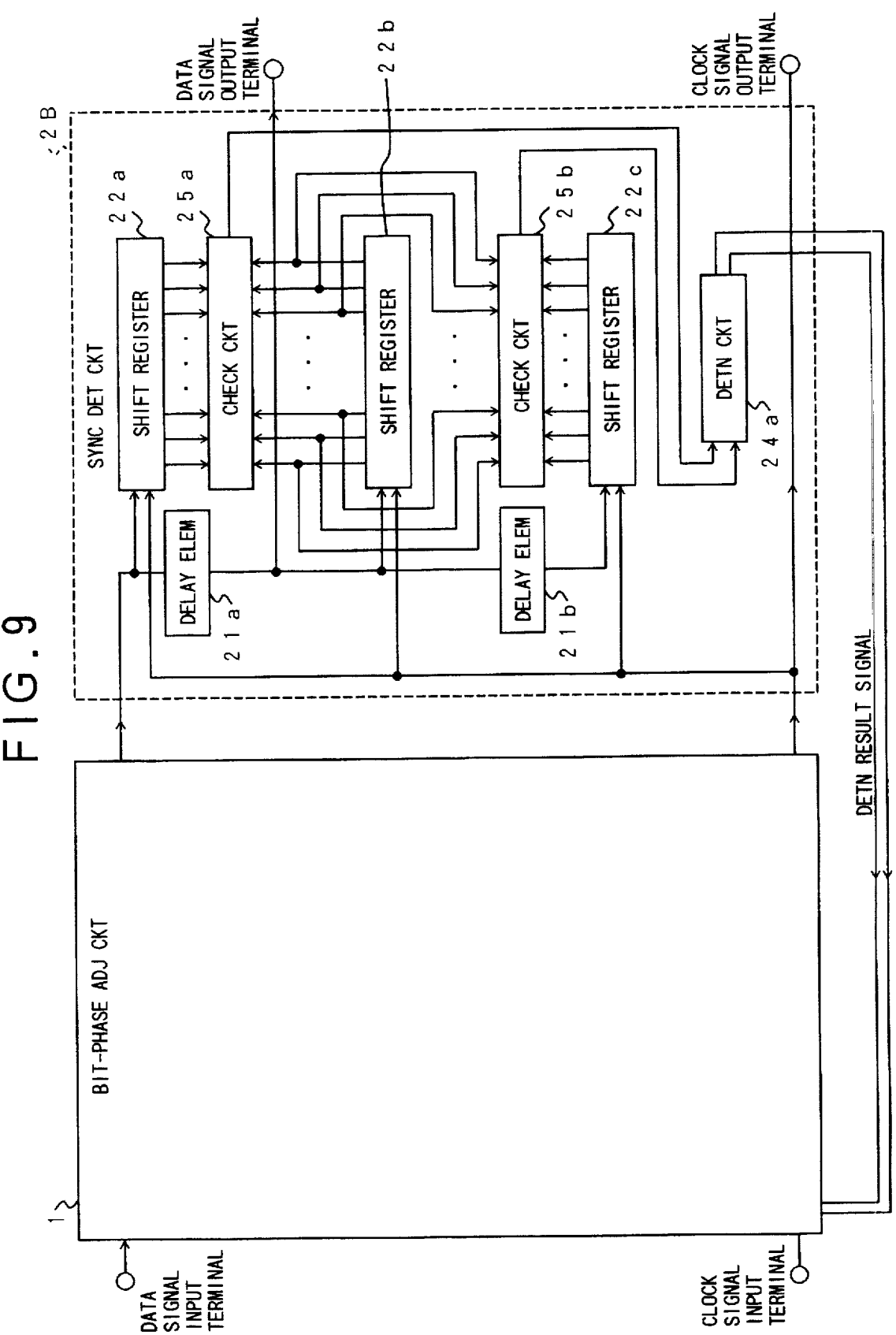
FIG. 9 is a diagram showing a structure of a bit-phase aligning circuit according to a fifth preferred embodiment of the present invention.

FIG. 9 is a diagram showing a structure of a bit-phase aligning circuit according to a fifth preferred embodiment of the present invention. The bit-phase aligning circuit of this embodiment features by a synchronization detection circuit 2B. Specifically, the synchronization detection circuit 2B includes the delay elements 21a and 21b, the shift registers 22a~22c, check circuits 25a and 25b instead of the synchronizing pattern check circuits 23a~23c, and a determination circuit 24a.

With this arrangement, when the synchronizing pattern is not inserted into the input data signal, the bit-phase alignment can be achieved by monitoring matching of the contents of the shift registers 22a~22c provided in the synchronization detection circuit 2B.

Specifically, the check circuit 25a checks the contents of the shift registers 22a and 22b and gives an answer to the determination circuit 24a as to whether the shift registers 22a and 22b agree with each other. like wise, the check circuit 25b checks the contents of the shift registers 22b and 22c and gives an answer to the determination circuit 24a as to whether the shift registers 22b and 22c agree with each other. When the check circuits 25a and 25b both give answers of "agreement", the determination circuit 24a generates a command to the bit-phase adjusting circuit 1 to hold the current phase relationship between the data signal and the clock signal.

On the other hand, when the check circuit 25a gives answer of "agreement" while the check circuit 25b gives answer of "disagreement", the determination circuit 24a generates a command to the bit-phase adjusting circuit 1 to delay a phase of the data signal relative to that of the clock signal.

On the other hand, when the check circuit 25b gives answer of "agreement" while the check circuit 25a gives answer of "disagreement", the determination circuit 24a enerates a command to the bit-phase adjusting circuit 1 to advance a phase of the data signal relative to that of the clock signal.

In this manner, the phase relationship between the data signal and the clock signal can be held so as not to produce a data error.

Effects similar to those of the foregoing first preferred embodiment can be achieved. Further, this embodiment can be applied to the data signal irrespective of whether the synchronizing pattern is contained or not.

Sixth Embodiment

Figure 12:
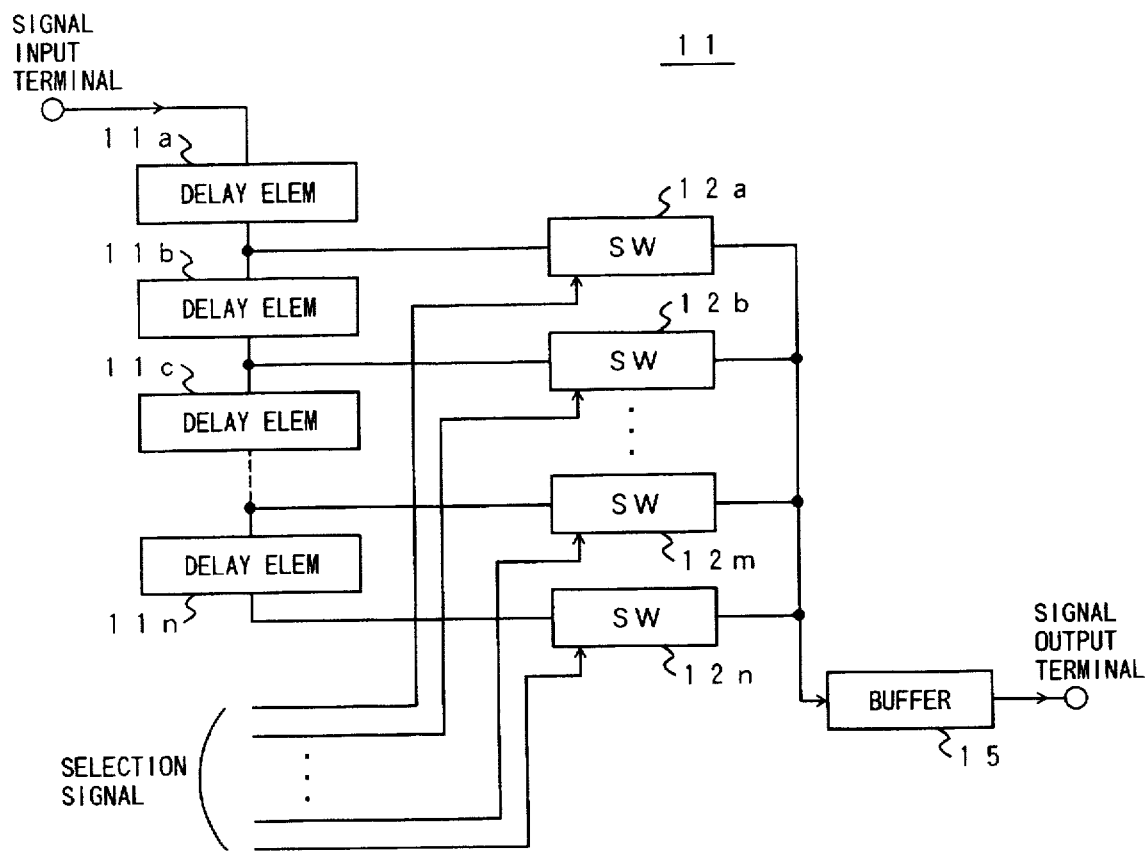
FIG. 12 is a diagram showing a structure of a variable delay circuit according to a sixth preferred embodiment of the present invention.

FIG. 12 is a diagram showing a structure of the variable delay circuit 11 according to a sixth preferred embodiment of the present invention. In FIG. 12, a signal input terminal is connected to the first of the serially-connected delay elements 11a~11n, and output sides of the delay elements 11a~11n are connected to the switches 12a~12n, respectively. Further, output sides of the switches 12a~12n are connected to a buffer 15 so that one of outputs from the delay elements 11a~11n is provided to the buffer 15 through the corresponding switch, depending on selection signals applied to the switches 12a~12n.

It is preferable that the delay elements 11a~11n are in the form of CMOS inverters, respectively.

FIGS. 13A and 13B are circuit diagrams each showing an example of a structure of each of the switches 12a~12n. As shown in FIGS. 13A and 13B, each of the switches 12a~12n includes CMOS gates 122 and 123 (or 125~128) and an inverter circuit 121 (or 124). An operation of the switch is determined by the selection signal. For preventing more than one of the switches 12a~12n from being turned on simultaneously, timing of the selection signals is set so that, after one of the switches 12a~12n is turned off, the next switch is turned on.

Figure 14A:
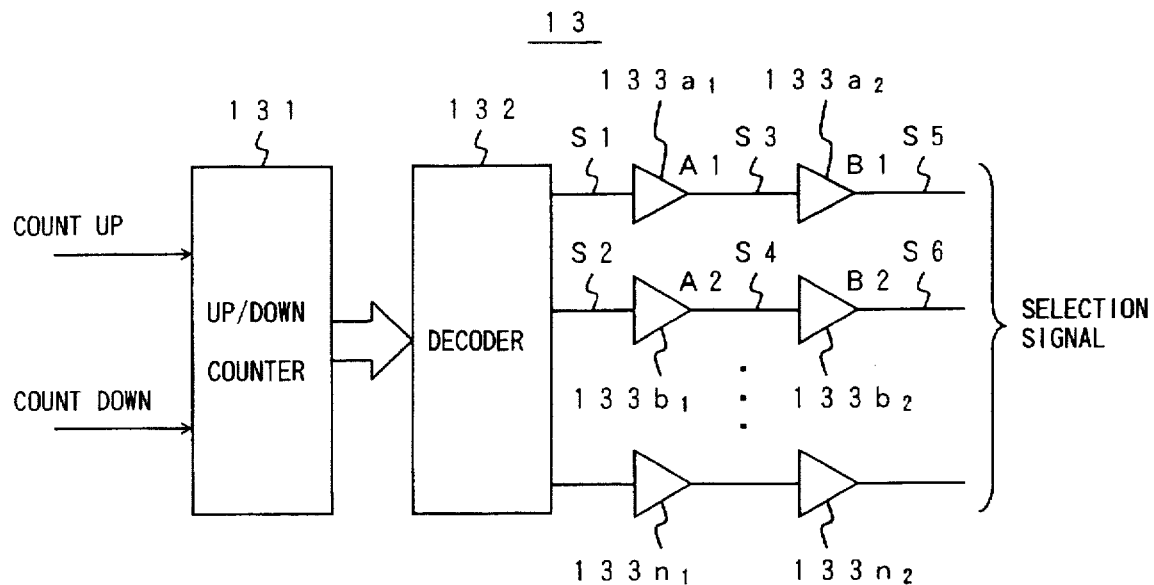
FIG. 14A is a diagram showing a structure of an up/down counter circuit employed in the preferred embodiments of the present invention.

FIG. 14A is a diagram showing a detailed circuit structure of the up/down counter circuit 13 shown in FIG. 2. In FIG. 14A, buffer circuits 133a~133n are provided each for rendering a rise time and a fall time which differ from each other relative to a corresponding output signal from an up/down counter 131 and a decoder 132 which output signal is used to set the delay amount of the variable delay circuit 11.

Figure 14B:
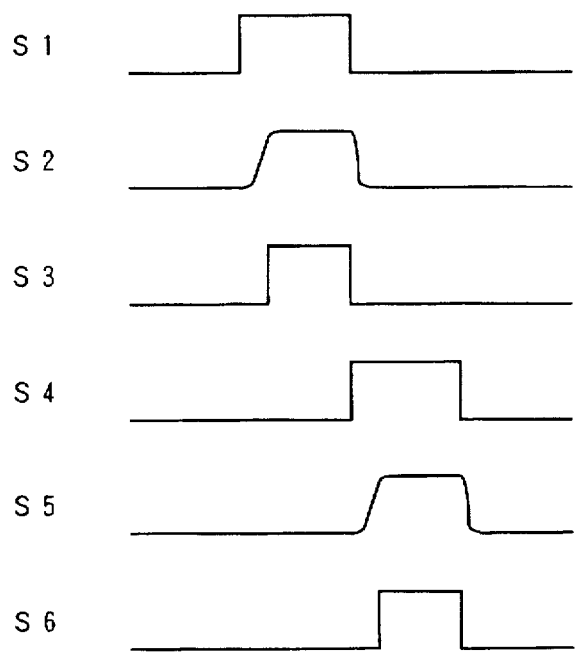
FIG. 14B is a diagram for explaining an operation of the up/down counter circuit shown in FIG. 14A.

In FIG. 14B, showing waveforms of signals S1~S6, by using a buffer which is slow in rising and fast in falling, a pulse having a shortened time at a logic "1" level (high level) can be produced for preventing more than one switch from being turned on simultaneously.

A difference between the rise time and the fall time of the output signal can be achieved by changing the driving capabilities of the two complementary transistors providing outputs of the CMOS gates.

The shortened time at a logic "1" level may also be achieved by setting input threshold levels of the buffer circuits 133a2~133n2 to be high.

Since more than one switch is not turned on simultaneously, waveform distortion due to changing the number of stages of the delay elements in the variable delay circuit 11 is not generated in the output of the variable delay circuit 11. The reason is that, during a time period from turning off one switch to turning on the next switch, a contact of the output terminal of the turned-off switch holds a voltage due to a capacitance of a conductor at the contact.

Figure 15:
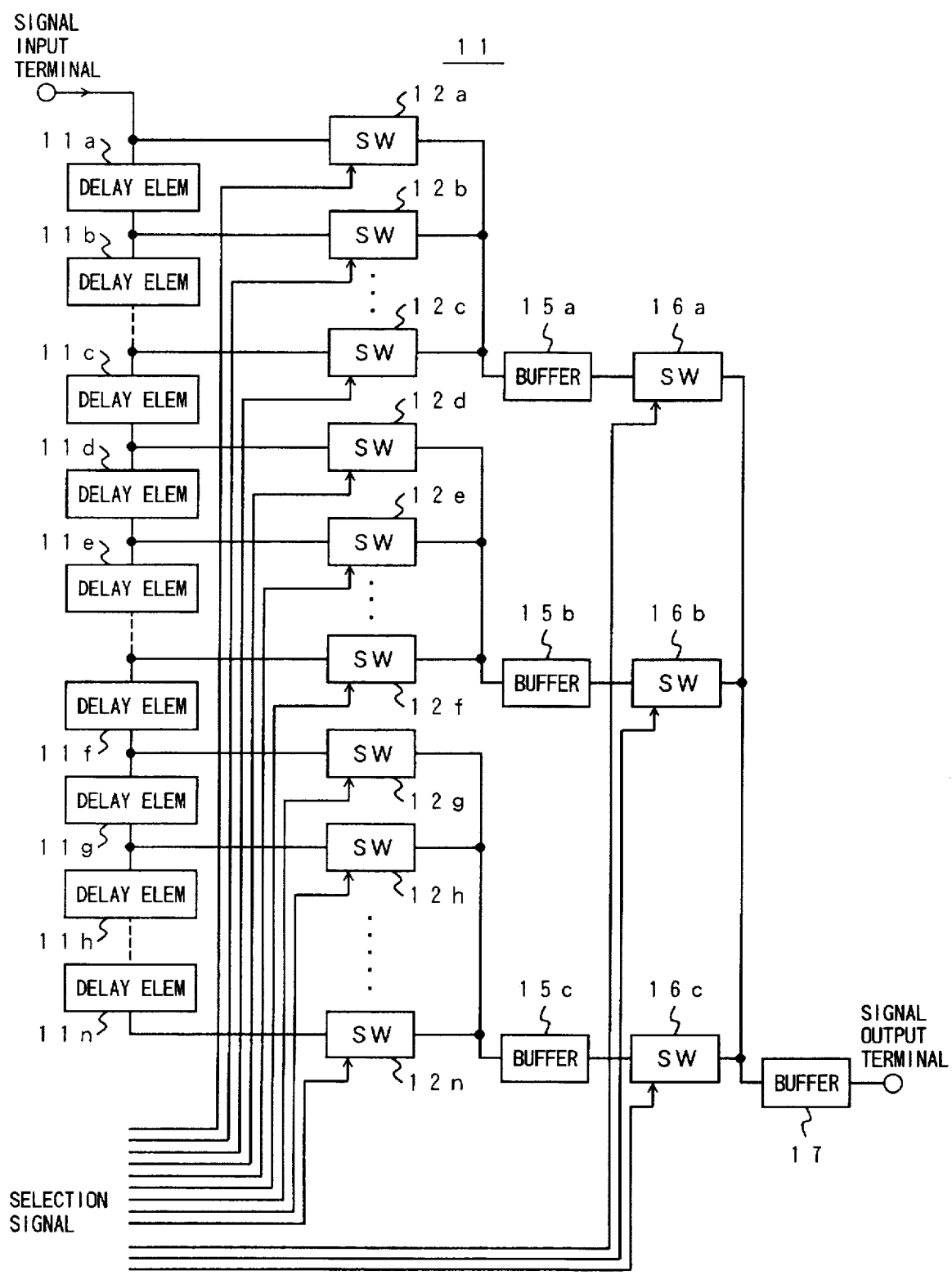
FIG. 15 is a diagram showing a structure of a variable delay circuit according to another preferred embodiment of the present invention.
Figure 16:
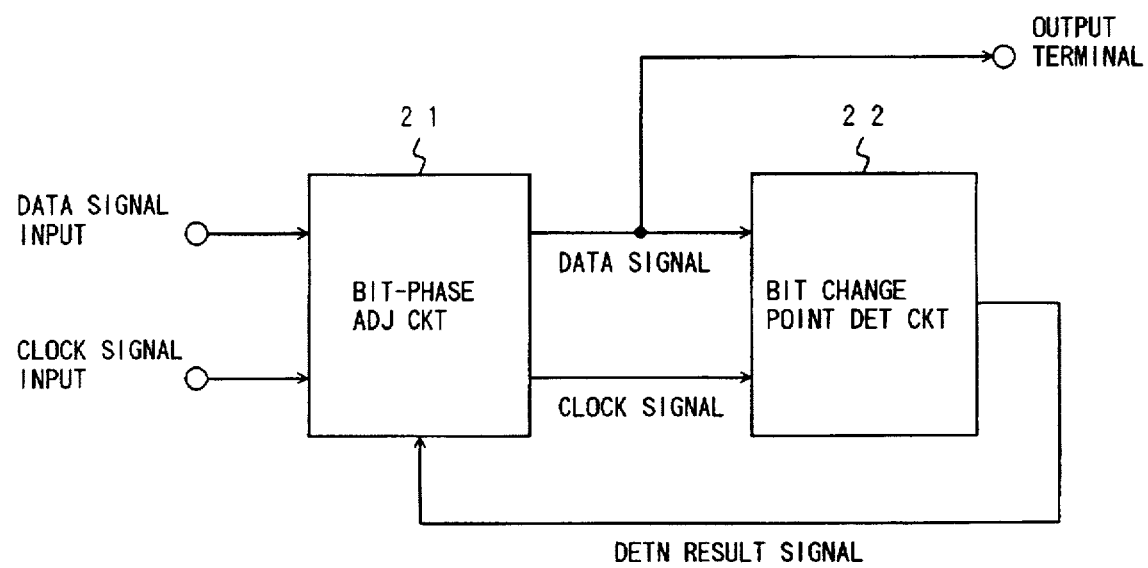
FIG. 16 is a diagram showing a structure of a conventional bit-phase aligning circuit.

Other Embodiments (1) It is also preferable that the switches of the variable delay circuit 11 are in the form of switch circuits 12a~12n and 16a~16c of a multi-stage structure as shown in FIG. 15. By providing selection signals so as not to turn on more than one of the switches 12 (12a~12n) and 16 (16a~16c) simultaneously and by providing the selection signals so as to change the state of the switch 16 after the influence due to the change of the state of the switch 12 is over, the waveform distortion due to changing the number of stages of the delay elements in the variable delay circuit 11 is not generated in the output of the variable delay circuit 11.

(2) Further, it is preferable that a portion of or all the bit-phase aligning circuit in the foregoing preferred embodiments is in the form of an integrated circuit.

(3) Further, the synchronizing pattern checked in the synchronizing pattern check circuit may be a portion of or all the synchronizing pattern inserted at the transmitter-side device.

(4) Further, the operation of the determination circuit for judging the outputs of the synchronizing pattern check circuit is not limited to the foregoing description. For example, in FIG. 2, it may be arranged to control the bit-phase adjusting circuit immediately using the detection signals from the three synchronizing pattern check circuits. It is also possible to provide a certain guard time. Further, eight detection results 000~111 can be derived from the outputs of the three synchronizing pattern check circuits. On the other hand, only the three results 111, 011 and 110 are shown in the foregoing description. As appreciated, the remaining five detection results can be easily controlled in the determination circuit in any desired manner.

(5) Further, the control method shown by the state transition diagram of FIG. 10 is not essential for the operation of the bit-phase aligning circuit of FIG. 1. Other control methods may also be used for providing better results as compared with the conventional circuit.

(6) Further, although the switches are used in the variable delay circuit 11, it is preferable to use a selector including logic elements.

(7) Further, although the up/down counter circuit 13 is used in the variable delay circuit 11, a sequential circuit having a similar function may also be used therefor.

(8) Further, although the CMOS device is used as a circuit element of the bit-phase adjusting circuit, it is also preferable to use a bipolar semiconductor device, a gallium arsenide semiconductor device, ECL device or the like for achieving low power consumption and high-speed operation.

(9) Further, the foregoing bit-phase aligning circuit is effectively applied to various communication devices, such as a data transmission device, a transmission terminal device, a repeating device, a synchronous terminal device, a terminal, an exchange, and a modem.

(10) Further, the phase adjusting control from the synchronizing pattern detection circuit 2 to the bit-phase adjusting circuit 1 may be achieved through a logic gate circuit or by execution of a program. This is preferable in view of size reduction.

(11) Further, an arrangement of the synchronizing pattern in the data signal may be a dispersed arrangement, a concentrated arrangement, or another type of arrangement.

(12) Further, it is preferable to use, as the synchronizing pattern, a pseudo-random code having high autocorrelation and its composite-type code.

(13) Further, as the input data, packet data, cell data, other frame data, word data, block data, and others may be used as long as the synchronizing pattern is arranged therein.

While the present invention has been described in terms of the preferred embodiments, the invention is not to be limited thereto, but can be embodied in various ways without departing from the principle of the invention as defined in the appended claims.

What is claimed is:

1. A bit-phase aligning circuit comprising:
   bit-phase adjusting means for receiving input data containing therein a synchronizing pattern and adjusting a bit-phase difference between the input data and an input clock; and
   synchronizing pattern detection means for detecting said synchronizing pattern in the input data, determining whether a phase relationship between the input data and the input clock is proper or improper based on whether said synchronizing pattern is detected or not, controlling said bit-phase adjusting means to adjust said bit-phase difference based on the determination result, presetting a first phase difference adjusting range for an asynchronous state and a second phase difference adjusting range for a synchronous state, controlling said bit-phase adjusting means by setting the phase difference adjusting range to said first phase adjusting range when the asynchronous state is determined by said synchronizing pattern detection means, and controlling said bit-phase adjusting means by setting the phase difference adjusting range to said second phase difference adjusting range when the synchronous state is determined by said synchronizing pattern detection means;
   wherein said second phase difference adjusting range is greater than said first phase difference adjusting range.

2. The bit-phase aligning circuit according to claim 1, wherein said bit-phase adjusting means includes delaying means for delaying the input data in response to a control input from said synchronizing pattern detection means so as to adjust the bit-phase difference relative to the input clock.

3. The bit-phase aligning circuit according to claim 1, wherein said bit-phase adjusting means includes delaying means for delaying the input clock in response to a control input from said synchronizing pattern detection means so as to adjust the bit-phase difference relative to the input data.

4. The bit-phase aligning circuit according to claim 2, wherein said delaying means includes
   a delay element section for delaying the input data, including a plurality of delay elements connected in series relative to the input data, and
   selecting means, responsive to the control input from said synchronizing pattern detection means, for selecting the input data from a selected point in the serially-connected delay elements and providing the selected input data to said synchronizing pattern detection means.

5. The bit-phase aligning circuit according to claim 3, wherein said delaying means includes
   a delay element section for delaying the input clock, including a plurality of delay elements connected in series relative to the input clock, and
   selecting means, responsive to the control input from said synchronizing pattern detection means, for selecting the input clock from a selected point in the serially-connected delay elements and providing the selected input clock to said synchronizing pattern detection means.

6. The bit-phase aligning circuit according to claim 4, wherein said selecting means includes a plurality of electric circuit elements corresponding to said delay elements, wherein each of said electric circuit elements is capable of being turned on or off, and wherein said selecting means, responsive to the control input from said synchronizing pattern detection means, selects the input data from said selected point in the serially-connected delay elements and provides the selected input data to the synchronizing pattern detection means by rendering one of said electric circuit elements turned on and the other electric circuit elements turned off.

7. The bit-phase aligning circuit according to claim 5, wherein said selecting means includes a plurality of electric circuit elements corresponding to said delay elements, wherein each of said electric circuit elements is capable of being turned on or off, and wherein said selecting means, responsive to the control input from said synchronizing pattern detection means, selects the input clock from said selected point in the serially-connected delay elements and provides the selected input clock to the synchronizing pattern detection means by rendering one of said electric circuit elements turned on and the other electric circuit elements turned off.

8. A bit-phase alignment circuit, comprising:
   a bit-phase adjusting circuit for receiving input data containing therein a synchronizing pattern, adjusting a bit-phase difference between the input data and an input clock, and generating adjusted input data having the adjusted bit-phase difference; and
   a synchronizing pattern detection circuit for receiving the adjusted input data, for detecting the synchronizing pattern in the adjusted input data, determining whether a phase relationship between the adjusted input data and the input clock is proper or improper based on whether the synchronizing pattern is detected or not, and generating a determination result signal to the bit-phase adjusting circuit for controlling the bit-phase adjusting circuit to re-adjust the bit-phase difference based on the determination result signal.

9. The bit-phase alignment circuit according to claim 8, wherein:
   the synchronizing pattern detection circuit includes
   a first check circuit for receiving the adjusted input data and the input clock,
   a second check circuit for receiving the adjusted input data delayed by a first delay element, and the input clock, and
   a third check circuit for receiving the adjusted input data delayed by the first delay element and a second delay element, and the input clock; and
   the synchronizing pattern detection circuit detects the synchronizing pattern from the received adjusted input data and determines whether the adjusted input data is in a synchronized, forward, or backward phase relationship with respect to the input clock, based on whether the synchronizing pattern is detected or not at each of the first, second, and third check circuits.

10. A bit-phase alignment circuit, comprising:

a bit-phase adjusting circuit for receiving input data containing therein a synchronizing pattern, adjusting a bit-phase difference between the input data and an input clock, and generating adjusted input data having the adjusted bit-phase difference, wherein the synchronizing pattern includes a bit sequence arranged periodically in the input data according to a predetermined rule; and a synchronizing pattern detection circuit for receiving the adjusted input data, for detecting the synchronizing pattern in the adjusted input data, determining whether a phase relationship between the adjusted input data and the input clock is proper or improper based on whether the synchronizing pattern is detected or not, and generating a determination result signal to the bit-phase adjusting circuit for controlling the bit-phase adjusting circuit to re-adjust the bit-phase difference based on the determination result signal.

11. The bit-phase alignment circuit according to claim 10, wherein:

the synchronizing pattern detection circuit includes a first check circuit for receiving the adjusted input data and the input clock, a second check circuit for receiving the adjusted input data delayed by a first delay element, and the input clock, and a third check circuit for receiving the adjusted input data delayed by the first delay element and a second delay element, and the input clock; and the synchronizing pattern detection circuit detects the synchronizing pattern from the received adjusted input data and determines whether the adjusted input data is in a synchronized, forward, or backward phase relationship with respect to the input clock, based on whether the synchronizing pattern is detected or not at each of the first, second, and third check circuits.

* * * * *